United States Patent
Jo et al.

(10) Patent No.: US 8,217,761 B2
(45) Date of Patent: Jul. 10, 2012

(54) METHOD FOR PREVENTING READER COLLISION, METHOD FOR DRIVING AN RFID READER USING THE METHOD AND RFID READER FOR PERFORMING THE METHOD

(75) Inventors: Geun-Sik Jo, Incheon (KR); Kwang-Cheol Shin, Incheon (KR); Seung-Bo Park, Incheon (KR)

(73) Assignee: Inha Industry Partnership Institute, Incheon (KR)

( * ) Notice: Subject to any disclaimer, the term of this patent is extended or adjusted under 35 U.S.C. 154(b) by 638 days.

(21) Appl. No.: 12/392,048

(22) Filed: Feb. 24, 2009

(65) Prior Publication Data

US 2010/0141392 A1    Jun. 10, 2010

(30) Foreign Application Priority Data

Dec. 4, 2008  (KR) ............................... 2008-122632

(51) Int. Cl.
*H04Q 5/22* (2006.01)
(52) U.S. Cl. ...................................... 340/10.2
(58) Field of Classification Search ............... 340/10.2, 340/3.41

See application file for complete search history.

(56) References Cited

U.S. PATENT DOCUMENTS

| | | | |
|---|---|---|---|
| 2006/0076401 A1* | 4/2006 | Frerking | 235/380 |
| 2006/0082454 A1* | 4/2006 | Fukuda et al. | 340/531 |
| 2007/0139163 A1* | 6/2007 | Powell et al. | 340/10.2 |
| 2008/0122581 A1* | 5/2008 | Bae et al. | 340/10.2 |

* cited by examiner

*Primary Examiner* — Brian Zimmerman
*Assistant Examiner* — Kaleria Knox
(74) *Attorney, Agent, or Firm* — Kile Park Goekjian Reed & McManus PLLC (57) ABSTRACT

A method for preventing reader collision, includes detecting the number of readable readers within a readable region of a target reader, calculating the number of peripheral readers within the readable region and a collision region of the target reader by using the number of the readable readers, forming one frame with time slots of which the number equals to the number of the peripheral readers, and setting a present time slot of the target reader to be one of the time slots, the one being selected randomly in the time slots. Therefore, a multiple-readers-to-tag interference which happens when more than one RFID reader tries to access to one tag and a reader-to-reader interference are prevented.

10 Claims, 7 Drawing Sheets

METHOD FOR PREVENTING READER COLLISION, METHOD FOR DRIVING AN RFID READER USING THE METHOD AND RFID READER FOR PERFORMING THE METHOD

PRIORITY STATEMENT

This application claims priority under 35 USC §119 to Korean Patent Application No. 2008-122632, filed on Dec. 4, 2008 in the Korean Intellectual Property Office (KIPO), the contents of which are herein incorporated by reference in their entirety.

BACKGROUND OF THE INVENTION

1. Field of the Invention

Example embodiments of the present invention relate to a method for preventing reader collision, a method for driving an RFID reader using the method for preventing reader collision, and an RFID reader for performing the method for preventing reader collision. More particularly, example embodiments of the present invention relate to a method for preventing collision among a plurality of readers, a method for driving an RFID reader using the method for preventing reader collision, and an RFID reader for performing the method for preventing reader collision.

2. Description of the Related Art

In general, a radio frequency identification (RFID) system includes a plurality of RFID tags, a plurality of RFID readers and an application software part. The RFID tag is attached to a surface of a product and contains information of the product. The RFID reader communicates with the RFID tag through a wireless signal to receive the information of the product. The application software part receives the information of the product from the RFID reader to perform various applications.

In the RFID system, an RFID collision may happen, so that a function of the RFID system may be deteriorated. The RFID collision means a state that the readers cannot read signals generated from a plurality of tags or a plurality of readers, since the tags or the readers occupy same time or same frequency band so that the signals generated from the tags or the readers are mixed with each other.

In general, the RFID collision may be classified as either a tag collision or a reader collision. The tag collision is a collision between tags when one reader reads signals of the tags, and the reader collision is a collision between readers. The reader collision may be classified as either a multiple-readers-to-tag interference or a reader-to-reader interference.

The multiple-readers-to-tag interference happens when a plurality of readers try to access to one tag simultaneously. The reader-to-reader interference happens when a signal generated by a target reader arrives at an adjacent reader to be mixed with a signal from a tag.

SUMMARY OF THE INVENTION

Example embodiments of the present invention provide a method for preventing reader collision.

Example embodiments of the present invention also provide a method for driving an RFID reader using the method for preventing reader collision.

Example embodiments of the present invention still also provide an RFID reader for performing the method for preventing reader collision.

According to one aspect of the present invention, the method prevents reader collision including a multiple-readers-to-tag interference which happens when more than one radio frequency identification (RFID) reader tries to access to one tag and a reader-to-reader interference. The method includes detecting the number of readable readers within a readable region of a target reader, calculating the number of peripheral readers within the readable region and a collision region of the target reader by using the number of the readable readers, forming one frame with time slots of which the number equals to the number of the peripheral readers, and setting a present time slot of the target reader to be one of the time slots, the one being selected randomly in the time slots.

Calculating the number of peripheral readers may be performed by estimating the number of the collision readers within the collision region, and adding the number of the readable readers to the number of the collision readers to obtain the number of the peripheral readers. The number of the peripheral readers may contain the target reader itself. Estimating the number of the collision readers may be performed by multiplying the number of the readable readers to a ratio of an area of the collision region to an area of the readable region to obtain the number of the collision readers.

The method may further include broadcasting a time slot synchronization information to the readers in the readable region for synchronizing frame start of the readable readers after the present time slot of the target reader is set.

According to another aspect of the present invention, the method for driving an RFID reader, includes allowing a target reader to access to a tag to communicate the tag, when a present time slot of the target reader in RFID readers is identical with a time slot ID which represent a performance sequence in one frame, and performing a reader collision-preventing algorithm, when the target reader and other reader simultaneously access to the tag or when the target reader are interfered by other reader.

Performing the reader collision-preventing algorithm, includes detecting the number of readable readers within a readable region of the target reader, calculating the number of peripheral readers within the readable region and a collision region of the target reader by using the number of the readable readers, forming one frame with time slots of which the number equals to the number of the peripheral readers, and setting a present time slot of the target reader to be one of the time slots, the one being selected randomly in the time slots. Performing the reader collision-preventing algorithm may further includes broadcasting time slot synchronization information to the readers in the readable region for synchronizing frame start of the readable readers after the present time slot of the target reader is set.

The method for driving an RFID reader may further include increasing the time slot ID by one after performing the reader collision-preventing algorithm.

According to still another aspect of the present invention, the radio frequency identification (RFID) reader capable of preventing a first interference that happens when more than one RFID reader accesses to one tag and a second interference that happens directly between RFID readers, includes a transmitting section, a receiving section, a main control section and a collision-preventing section. The transmitting section transmits an RF transmitting signal through an antenna. The receiving section receives an RF receiving signal from the tag through the antenna. The main control section controls the transmitting section to generate the RF transmitting signal and processes information of the tag, which is contained in the RF receiving signal. The collision-preventing section forms one frame with time slots of which the number is equal to the number of peripheral readers within a collision region when the first or second interference happens, and sets a present time slot of a target reader to be one of the time slots, the one being selected randomly in the time slots. The collision-preventing section may further broadcast time slot synchronization information to the readers in the readable region for synchronizing frame start of the readable readers after the present time slot of the target reader is set.

According to the present invention, the number of the peripheral readers, which is within the readable region and collision region of the target reader in which collision happens, is calculated, one frame is divided into time slots of which the number is set to be the number of the peripheral readers, and the present time slot of the target reader is reset to be one of the time slots having the number of the peripheral readers, randomly. Therefore, the multiple-readers-to-tag interference which happens when more than one reader simultaneously access to one tag, and the reader-to-reader interference between the readers may be prevented. Furthermore, the RFID system including a plurality of readers is enhanced in stability and processing speed by preventing the collisions among readers.

BRIEF DESCRIPTION OF THE DRAWINGS

The above and other features and advantages of the present invention will become more apparent by describing in detailed example embodiments thereof with reference to the accompanying drawings.

DETAILED DESCRIPTION OF THE INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
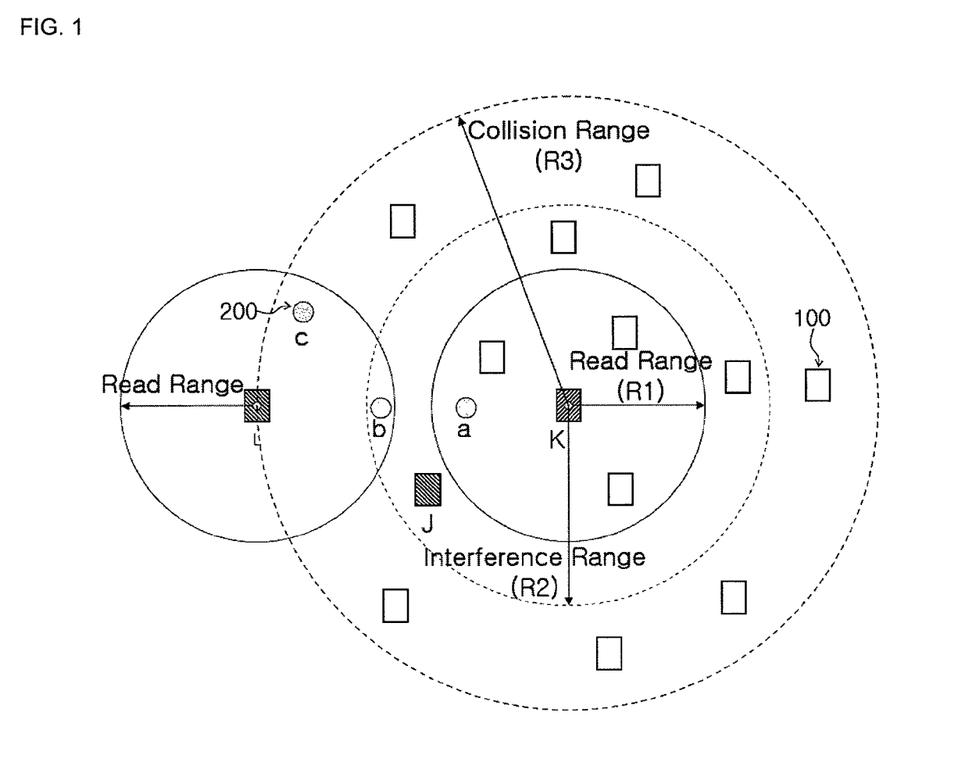
FIG. 1 is a diagram showing a relationship between a plurality of RFID readers and a plurality of RFID tags.
Figure 2:
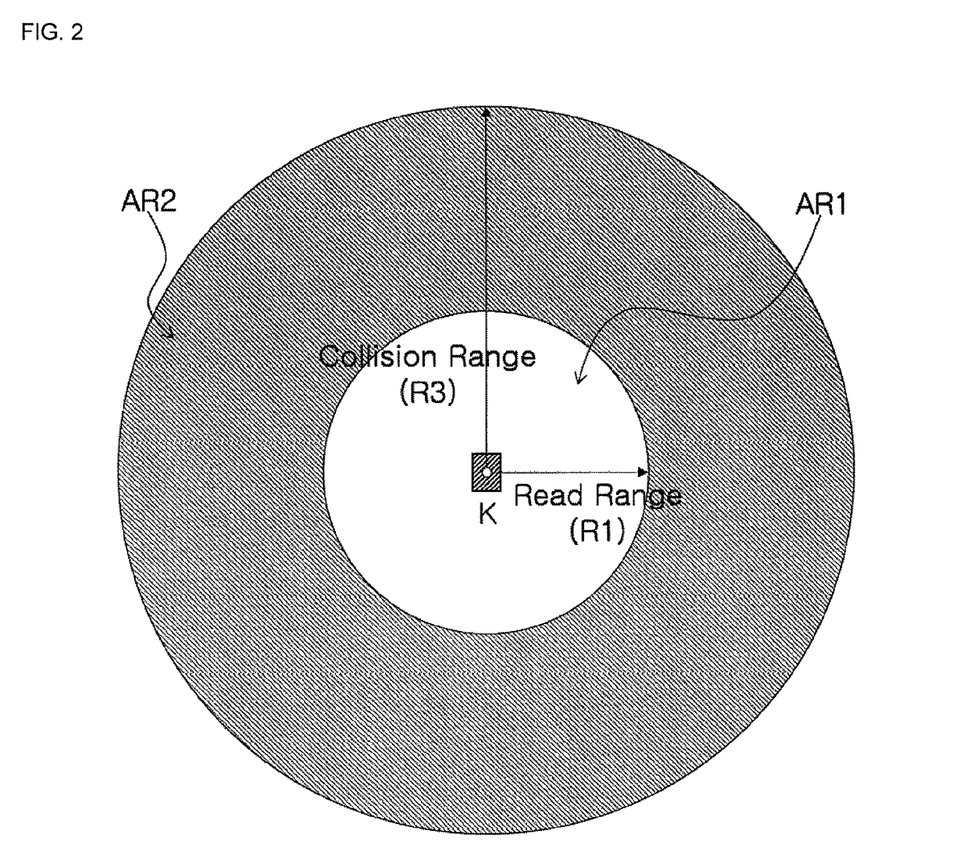
FIG. 2 is a diagram showing a relationship between a read area and a collision area in FIG. 1.

FIG. 1 is a diagram showing a relationship between a plurality of RFID readers and a plurality of RFID tags, and FIG. 2 is a diagram showing a relationship between a read area and a collision area in FIG. 1.

Referring to FIGS. 1 and 2, a plurality of radio frequency identification (RFID) readers 100 and a plurality of RFID tags 200 are distributed. Hereinafter, the RFID reader 100 is referred to as a reader 100 and the RFID tag 200 is referred to as a tag 200 for convenience.

The readers 100 may be movable RFID readers, and the tags 200 may be stationary RFID tags or movable RFID tags. For example, the tags 200 may be attached to a product and contains information of the product. For example, the tags 200 may contains record such as a date of manufacture, a date of warehousing, a name, trademark, etc.

Each of the readers 100 moves around and communicates with the tags 200 through wireless signal to get information of products from the tags 200. In detail, the readers 100 transmits an RF transmitting signal of about 860~960 MHz to the tags 200, and the tags 200 receives the RF transmitting signal to transform the RF transmitting signal into a signal containing the information of the product and transmits the signal to the RFID readers 100. That is, the tags 200 may be passive type RFID tags including no power source. Alternatively, all of the tags 200 may be active type RFID tags including a power source, or a portion of the tags may be the passive type RFID tags and a remaining portion of the tags may be the active type RFID tags.

A range of each of the readers 100 may be classified as a readable range R1, an interference range R2 or a collision range R3, regarding collision.

Each of the readers 100 may communicate with tags 200 or other readers 100 within the readable range R1 through signal. However, the readers 100 cannot access to the tags 200 or other readers 100 out of the readable range R1.

Each of the readers 100 may be interfered by other readers 100 within a region from the readable range R1 to the interference range R2 to induce the reader-to-reader interference. The reader-to-reader interference happens when a signal generated by a target reader arrives at an adjacent reader to be mixed with a signal from a tag. The reader-to-reader interference may happen within the readable range R1.

Each of the readers 100 may be interfered by other readers 100 within a region from the readable range R1 to the collision range R3 to induce the multiple-readers-to-tag interference. The multiple-readers-to-tag interference happens when a plurality of readers 100 may simultaneously access to one tag to be interfered by one another. The multiple-readers-to-tag interference may happen within the readable range R1.

Hereinafter, K reader, L reader and J reader in the readers 100 will be explained in detail.

The K reader communicates with the tags 200 or the readers 100 in a readable region AR1 which is within the readable range R1 through wireless signal. In FIG. 1, the L reader and the J reader are outside of the readable region AR1, so that the K reader cannot access to the L reader and the J reader.

The K reader may be interfered by other readers 100 in an interference region which is between the readable range R1 and the interference range R2 to induce the reader-to-reader interference. In FIG. 1, the J reader is in the interference region, so that the K reader may be interfered by a wireless signal arriving at the J reader from one tag.

Additionally, the K reader may be interfered by other readers 100 in a collision region AR2 which is between the readable range R1 and the collision range R3 to induce the multiple-readers-to-tag interference. In FIG. 1, the L reader is in the collision region AR2, so that the K reader may be interfered by the L reader in communicating with tags 200 in the interference region through wireless signal.

For example, when an a tag is in the readable region AR1, a b-tag and c-tag are in the collision region AR2, the K reader can communicate with the a-tag through wireless signal, but the K reader cannot communicate with the b-tag and the c-tags through wireless signal.

Furthermore, when the b-tag and the c-tags are within the readable range of the L reader, the L reader can communicate with the b-tag and the c-tags through a wireless signal. However, when the b-tag is within the interference range R2 and the c-tag is outside of the interference range R2, the L reader can communicate with the c-tag through wireless signal but the K reader may interfere the communication between the b-tag and the L reader.

Figure 3:
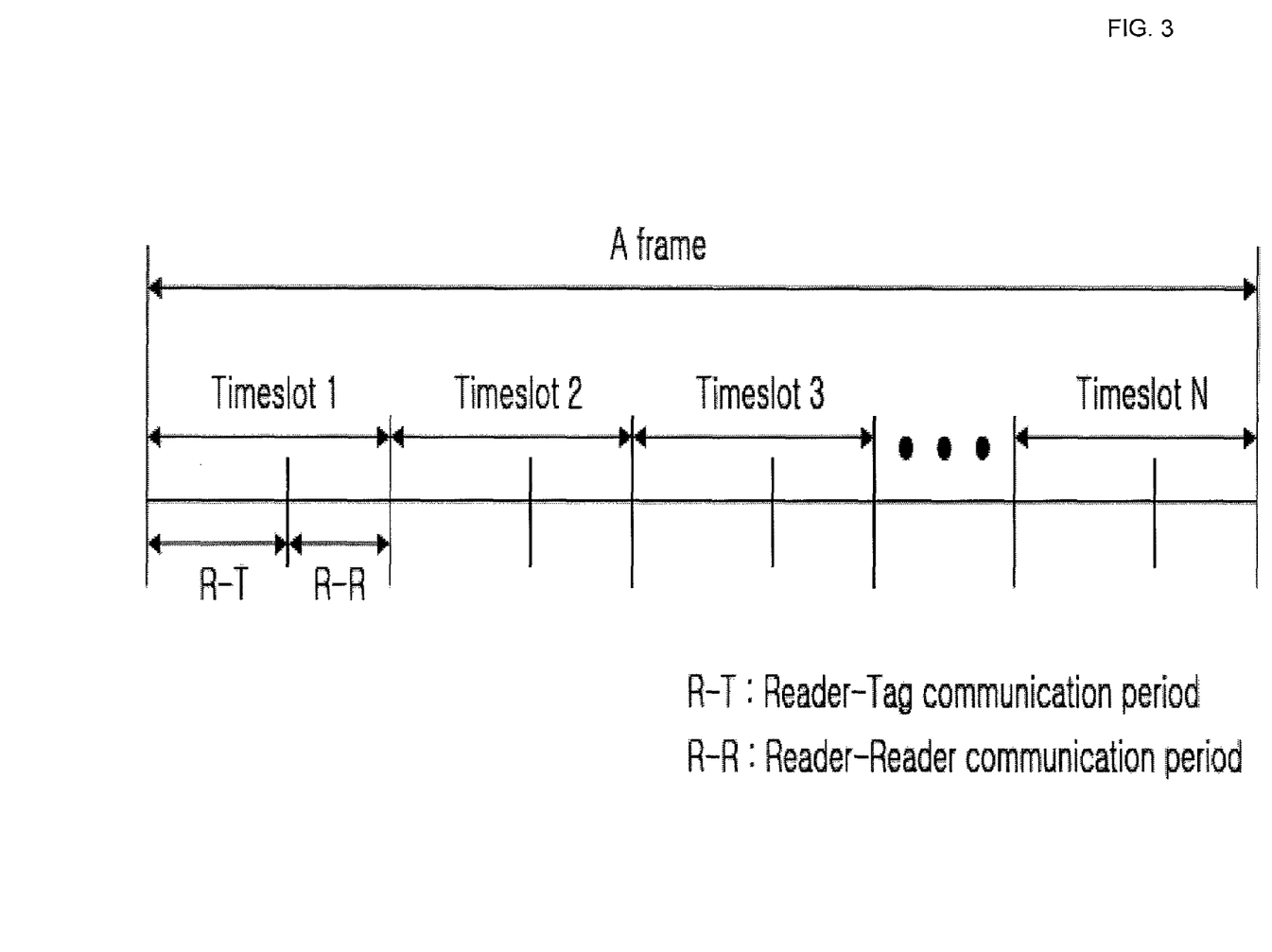
FIG. 3 is a diagram showing a frame including a plurality of time slots.

FIG. 3 is a diagram showing a frame including a plurality of time slots.

Referring to FIG. 3, in order to prevent collision between readers as described above, a time division multiple access (TDMA) method may be applied. According to the TDMA method of the present invention, a frame is divided into a plurality of time slot, and one reader accesses to a tag which is adjacent to the reader in each of the time slots to prevent collision between the readers. The time slots in the frame receive a time slot ID according to a sequence. The time slot ID has an integer of no less than one.

Each of the time slots may have the same and fixed time interval. Therefore, the time interval of one frame may be changed according to the number of the time slots. However, when the time interval of one frame is fixed, the time interval of each of the time slots may be changed according to the number of the time slots.

Each of the time slots may be divided into a first period in which a communication between a reader and a tag is performed, and a second period in which a communication between readers is performed. Hereinafter, the first period, in which a communication between a reader and a tag is performed, is referred to as an R-T period, and the second period, in which a communication between readers is performed readers, is referred to as an R-R period.

In FIG. 3, the R-T period precedes the R-R period in each of the time slots, but the R-R period may precede the R-T period.

Figure 4:
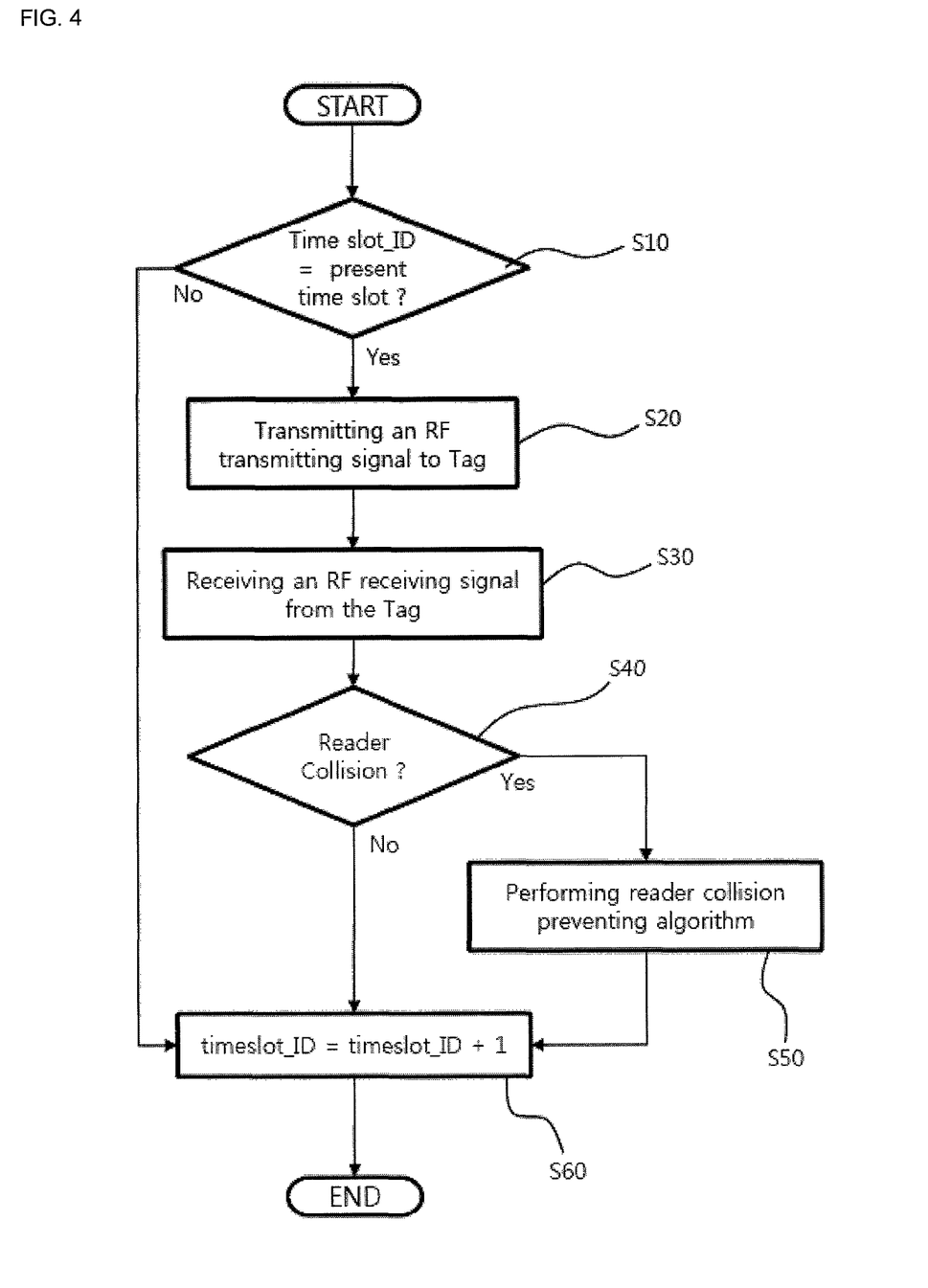
FIG. 4 is a flow-chart showing a method of driving an RFID reader, according to an exemplary embodiment of the present invention.

FIG. 4 is a flow-chart showing a method of driving an RFID reader, according to an exemplary embodiment of the present invention.

Referring to FIGS. 1 to 4, a method for driving an RFID reader according to an exemplary embodiment of the present invention is performed by the TDMA method through which a target reader make contact with tags. The target reader is one of the readers 100 in FIG. 1.

According to the method, the present time slot allotted to the target reader is checked to be identical with the time slot ID which shows a performance order in one frame (step S10). The present time slot has a performance order, of which time slot period the target reader operates.

When the present time slot is identical with the time slot ID, the target reader can access to the tag 200 in a readable region of the target reader to communicate with the tag 200 through wireless signal. In detail, the target reader transmits an RF transmitting signal to the tag 200 (step S20), and then the tag 200 transforms the RF transmitting signal to a signal containing the information of the tag 200 in order to transmit the signal to the target reader. Hereinafter, the signal containing the information of the tag 200 is referred to as an RF receiving signal. The target reader receives the RF receiving signal to readout the information contained in the RF receiving signal (step S30). In the present embodiment, the step S20 and the step S30 are performed in the R-T period of FIG. 2.

Then, checking of the reader collision (the reader-to-reader interference and the multiple-readers-to-tag interference) is performed (step S40).

When the reader collision is happening, a reader collision-preventing algorithm is performed (step S50). According to the present embodiment, the reader collision-preventing algorithm may be performed in the R-R period of FIG. 2. The reader collision-preventing algorithm will be explained in detail, referring to FIG. 5.

Then, when the reader collision-preventing algorithm is performed, the time slot ID is increased by one (step S60).

The step S60 in which the time slot ID is increased by one, is performed when the present time slot is not identical with the time slot ID or when the multiple-readers-to-tag interference does not happen.

As described above, when operation of the target reader is completed, remaining readers are sequentially driven through a method through which the target reader is driven as described above.

Figure 5:
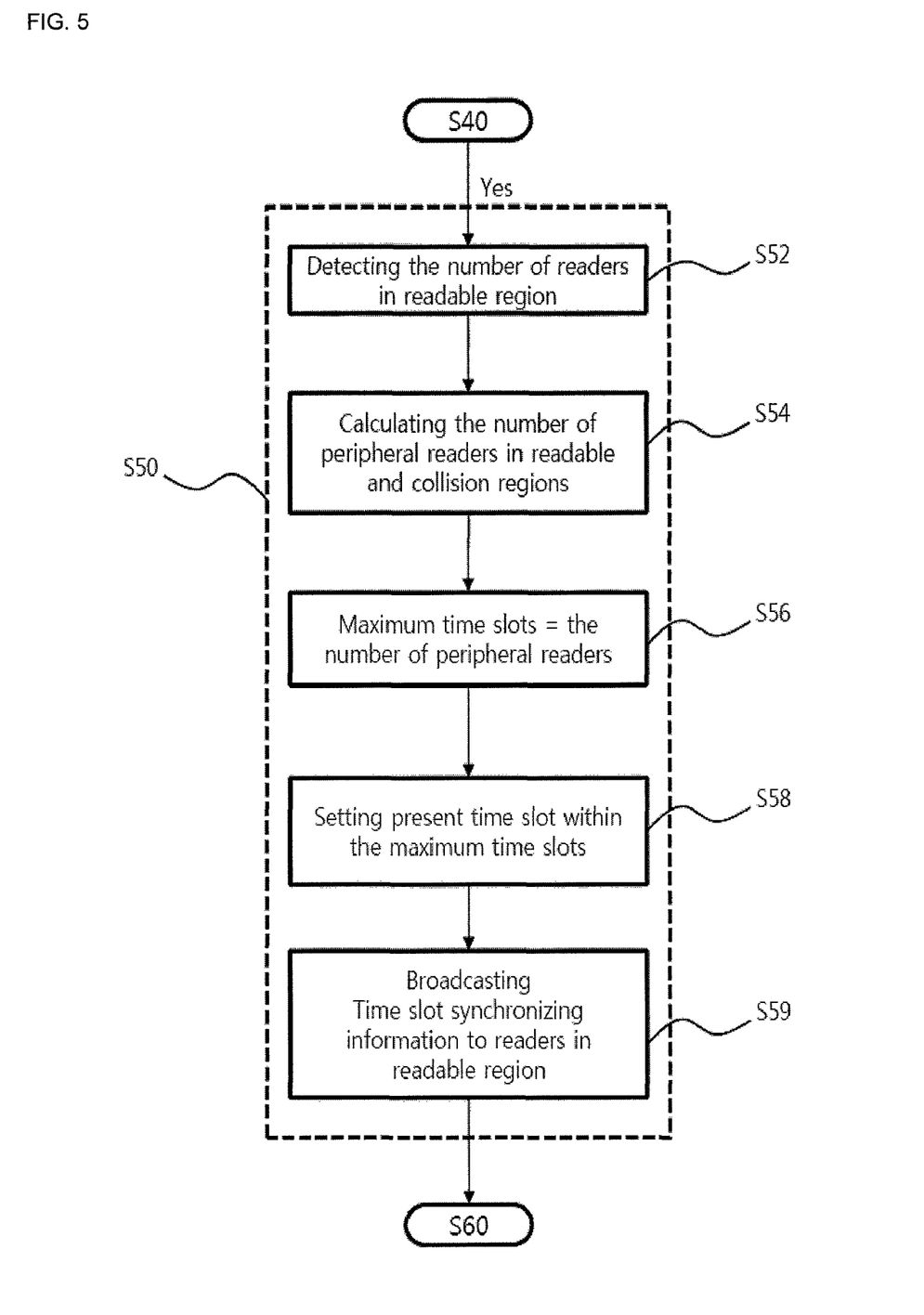
FIG. 5 is a flow-chart showing a collision preventing algorithm among multiple readers in the method of driving an RFID reader of FIG. 4.

FIG. 5 is a flow-chart showing a collision preventing algorithm among multiple readers in the method of driving an RFID reader of FIG. 4.

Referring to FIG. 5, in the reader collision-preventing algorithm, the number of readers in the readable region of the target reader (the number of readable readers) (step S52). In detail, the target reader detects the number of the readable readers in the readable region through a wireless signal.

Then, the target reader calculates the number of readers in the readable region and the collision region (the number of peripheral readers) (step S54) by using the number of the readable readers.

Hereinafter, the step S54 will be explained in detail. The number of readers in the collision region (or the number of collision readers) is estimated by using the number of the readable readers. According to the present embodiment, the number of collision readers is estimated under the assumption that the density of the readers is uniform throughout all regions. That is, the number of the collision readers may be obtained by multiplying the number of the readable readers by a ratio of the area of the collision region to the area of the readable region. Then, the number of the peripheral readers is obtained by adding the number of the collision readers to the number of the readable readers. In this case, the number of the peripheral readers includes the target reader itself.

Then, one frame is newly set to be the time slots of the peripheral readers, which is calculated as described above (step S56). That is, a maximum time slot of the one frame is set to be the number of the peripheral readers. Therefore, when each of the time slots is fixed and the number of the time slots which is newly set increases, the time interval of the one frame increases.

Then, the present time slot of the target reader is newly set to be one of time slots of the peripheral readers, which is randomly selected (step S58). That is, the present time slot of the target reader is randomly selected in the maximum time slot.

Then, time slot synchronization information is broadcasted to the readers in the readable region (or the readable readers) (step S59).

The reason why the time slot synchronization information is broadcasted to the readable readers is for synchronizing frames of the readable readers. In detail, synchronizing frames of the readable readers means synchronizing a start time of frame of the readable readers in order to prevent discordance of the start time of frame, which may be induced by independent operation of readers.

The time slot synchronization information is broadcasted to the readable readers, so that the readable readers may start the next frame at the same time.

Hereinafter, an RFID system including RFID reader that performs the method described referring to FIGS. 1 to 5 will be explained.

Figure 6:
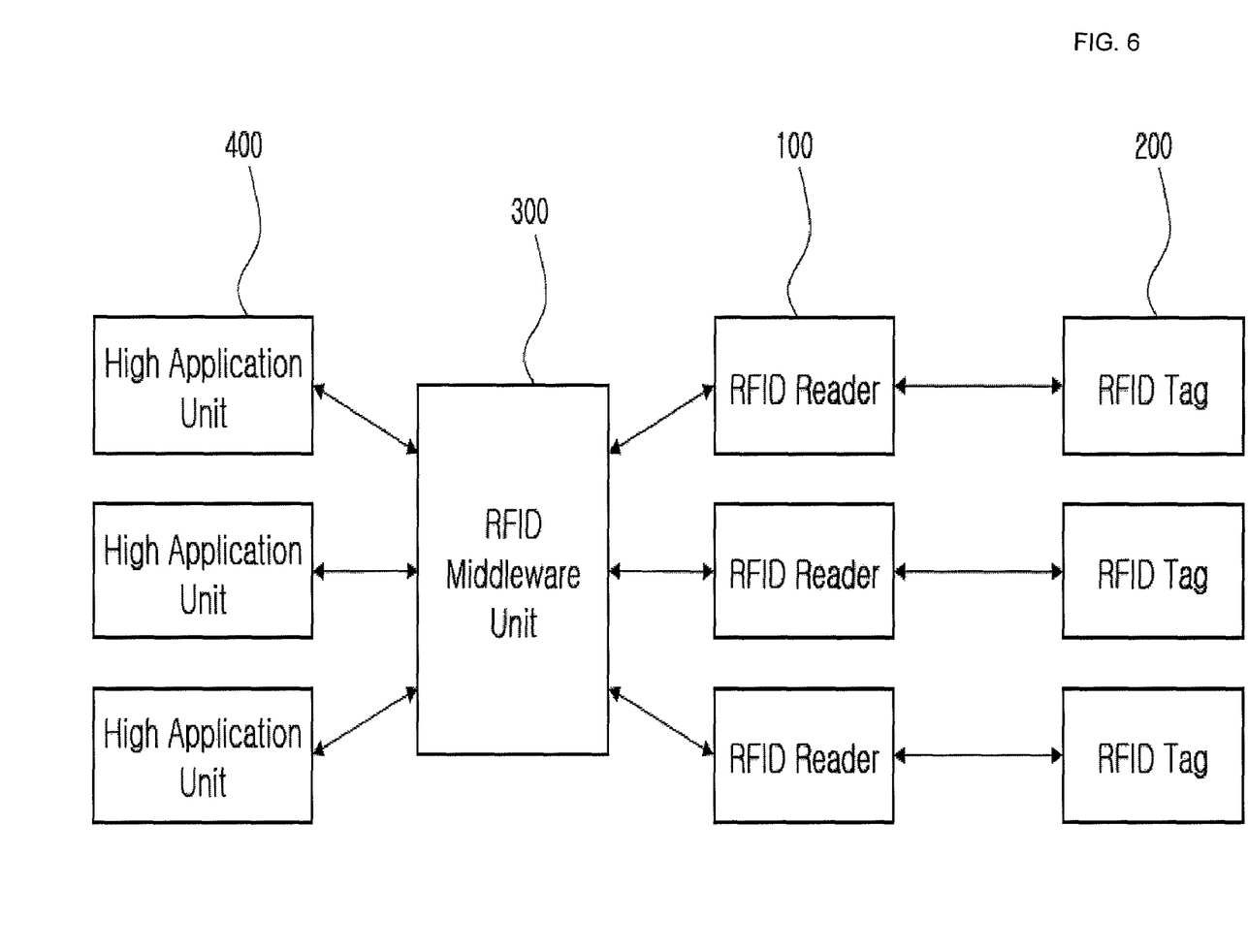
FIG. 6 is a block diagram showing an RFID system including an RFID reader.

FIG. 6 is a block diagram showing an RFID system including an RFID reader.

Referring to FIG. 6, an RFID system according to an exemplary embodiment of the present may include a plurality of RFID readers 100, a plurality of RFID tags 200, an RFID middleware unit 300 and at least one high application unit 400. Hereinafter, the RFID reader 100 is referred to as a reader 100, the RFID tag 200 is referred to as a tag 200, the RFID middleware unit 300 is referred to as a middleware unit 300, and the high application unit 400 is referred to as an application unit 400, for convenience.

Each of the readers 100 may access to the tags 200 through wireless signal to readout information from the tags 200. For example, the reader 200 may be equipped in a transportable apparatus such as a cart of a market, a forklift truck of warehouse, a book reader in a library, a mobile phone, a personal digital assistance (PDA), etc., and the tag 200 may be attached on a display stand for goods, a shelf for goods, a rack for books in a thin plate shape.

Each of the readers 100 transmits information that is read-out from the tags 200 to the middleware unit 300. In some cases, each of the readers 100 may receive signals from the middleware unit 300 to be controlled.

The middleware unit 300 connects the readers 100 to the application unit 400. In detail, the middleware unit 300 converts a first data readout from the tags 200 into a second data applicable to the application unit 400 and transmits the second data to the application unit 400.

The application unit 400 may perform various application programs by using the second data from the middleware unit 300.

However, one of the middleware unit 300 and the application unit 400 may be omitted. For example, when the middleware unit 300 is omitted, the reader 100 may perform the operation of the middleware unit 300.

Figure 7:
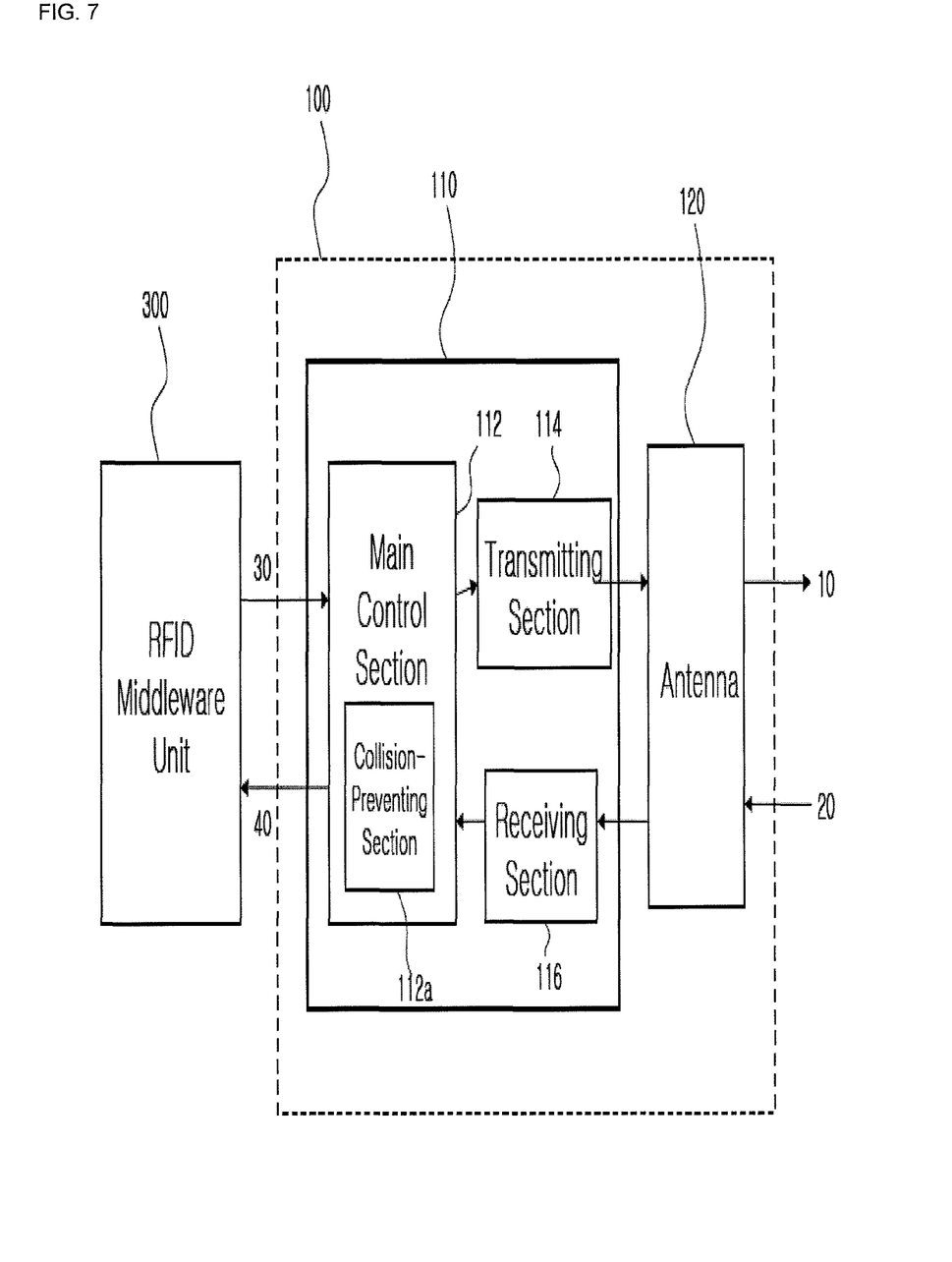
FIG. 7 is a block diagram showing the RFID reader in FIG. 6.

FIG. 7 is a block diagram showing the RFID reader in FIG. 6.

Referring to FIGS. 6 and 7, each of the readers 100 according to an exemplary embodiment of the present invention includes a reader module 110 and an antenna 120. The reader module 110 may include a main control section 112, a transmitting section 114, a receiving section 116 and a collision-preventing section 112a.

The main control section 112 controls the transmitting section 114 to generate an RF transmitting signal 10, and the transmitting section 114 transmits the RF transmitting signal 10 to the tag 200 through the antenna 120. The receiving section 116 receives an RF receiving signal 20 through the antenna 120 from the tag 200, and the main control section 112 receives information of the tag 200, which is contained in the RF receiving signal 20, from the receiving section 116 to analyze and interpret the information.

The main control section 112 is controlled by a control signal 30 applied from the middleware unit 300, and transmits a data 40 containing the information of the tag 200 to the middleware unit 300.

The collision-preventing section 112a performs the reader collision-preventing algorithm explained referring to FIG. 5. That is, the collision-preventing section 112a detects the number of the readable readers within the readable region, estimates the number of the collision readers in the collision region by using the number of the readable readers, calculates the number of the peripheral readers by adding the number of the readable readers to the number of the collision readers, divides one frame into time slots having the number of the peripheral readers, and then resets the present time slot to be one of the time slots having the number of the peripheral readers, randomly. In this case, the collision-preventing section 112a may estimate the number of the collision readers by multiplying the number of the readable readers by the ratio of an area of the collision region to an area of the readable region.

When the collision-preventing section 112a resets the present time slot, the collision-preventing section 112a may further broadcast time slot synchronization information to the readable readers in the readable region, for synchronizing start of a frame.

The collision-preventing section 112a may be equipped in the main control section 112 as shown in FIG. 7, but the collision-preventing section 112a may be separately formed from the main control section 112. The collision-preventing section 112a, which is separately formed from the main control section 112, may be controlled by the main control section 112 to perform the reader collision-preventing algorithm.

According to the present invention, the number of the peripheral readers, which is within the readable region and collision region of the target reader in which collision happens, is calculated, one frame is divided into time slots of which the number is set to be the number of the peripheral readers, and the present time slot of the target reader is reset to be one of the time slots having the number of the peripheral readers, randomly.

Therefore, the multiple-readers-to-tag interference which happens when more than one reader simultaneously access to one tag, and the reader-to-reader interference between the readers may be prevented. Furthermore, the RFID system including a plurality of readers is enhanced in stability and processing speed by preventing the collisions among readers.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method for preventing reader collision including a multiple-readers-to-tag interference which happens when more than one radio frequency identification (RFID) reader tries to access to one tag and a reader-to-reader interference, the method comprising:
    detecting the number of readable readers within a readable region of a target reader;
    calculating the number of peripheral readers within the readable region and a collision region of the target reader by using the number of the readable readers;
    forming one frame with time slots of which the number equals to the number of the peripheral readers; and
    setting a present time slot of the target reader to be one of the time slots, the one being selected randomly in the time slots,
    wherein calculating the number of peripheral readers, comprising:
    estimating the number of the collision readers within the collision region; and
    adding the number of the readable readers to the number of the collision readers to obtain the number of the peripheral readers,
    wherein estimating the number of the collision readers, comprising:
    multiplying the number of the readable readers to a ratio of an area of the collision region to an area of the readable region to obtain the number of the collision readers.

2. The method of claim 1, wherein the number of the peripheral readers contains the target reader itself.

3. The method of claim 1, wherein the readers are movable RFID readers.

4. The method of claim 1, further comprising broadcasting a time slot synchronization information to the readers in the readable region for synchronizing frame start of the readable readers after the present time slot of the target reader is set.

5. A method for driving an RFID reader, the method comprising:
    allowing a target reader to access to a tag to communicate the tag, when a present time slot of the target reader in RFID readers is identical with a time slot ID which represent a performance sequence in one frame; and
    performing a reader collision-preventing algorithm, when the target reader and other reader simultaneously access to the tag or when the target reader are interfered by other reader,
    wherein performing the reader collision-preventing algorithm, comprises:
    detecting the number of readable readers within a readable region of the target reader;
    calculating the number of peripheral readers within the readable region and a collision region of the target reader by using the number of the readable readers;
    forming one frame with time slots of which the number equals to the number of the peripheral readers; and
    setting a present time slot of the target reader to be one of the time slots, the one being selected randomly in the time slots,
    wherein calculating the number of peripheral readers, comprising:
    estimating the number of the collision readers within the collision region; and
    adding the number of the readable readers to the number of the collision readers to obtain the number of the peripheral readers,
    wherein estimating the number of the collision readers, comprising:
    multiplying the number of the readable readers to a ratio of an area of the collision region to an area of the readable region to obtain the number of the collision readers.

6. The method of claim 5, wherein the number of the peripheral readers contains the target reader itself.

7. The method of claim 5, further comprising increasing the time slot ID by one after performing the reader collision-preventing algorithm.

8. The method of claim 5, wherein performing the reader collision-preventing algorithm further comprises broadcasting time slot synchronization information to the readers in the readable region for synchronizing frame start of the readable readers after the present time slot of the target reader is set.

9. A radio frequency identification (RFID) reader capable of preventing a first interference that happens when more than one RFID reader accesses to one tag and a second interference that happens directly between RFID readers, comprising:

a transmitting section transmitting an RF transmitting signal through an antenna;

a receiving section receiving an RF receiving signal from the tag through the antenna;

a main control section controlling the transmitting section to generate the RF transmitting signal and processing information of the tag, which is contained in the RF receiving signal; and a collision-preventing section forming one frame with time slots of which the number is equal to the number of peripheral readers within a collision region when the first or second interference happens, and setting a present time slot of a target reader to be one of the time slots, the one being selected randomly in the time slots, wherein the collision-preventing section detects the number of readable readers within a readable region of the target reader, estimates the number of the collision readers within the collision region, adds the number of the readable readers to the number of the collision readers to obtain the number of the peripheral readers, divides the one frame into time slots of which the number equals to the number of the peripheral readers, and sets a present time slot of the target reader to be one of the time slots, the one being selected randomly in the time slots, wherein the collision-preventing section estimates the number of the collision readers by multiplying the number of the readable readers to a ratio of an area of the collision region to an area of the readable region to obtain the number of the collision readers.

10. The RFID reader of claim 9, wherein the collision-preventing section further broadcasts a time slot synchronization information to the readers in the readable region for synchronizing frame start of the readable readers after the present time slot of the target reader is set.

* * * * *